United States Patent
Kim et al.

(10) Patent No.: US 12,471,147 B2
(45) Date of Patent: Nov. 11, 2025

(54) METHOD AND APPARATUS FOR ACQUIRING AND MAINTAINING SYNCHRONIZATION IN COMMUNICATION SYSTEMS

(71) Applicant: ELECTRONICS AND TELECOMMUNICATIONS RESEARCH INSTITUTE, Daejeon (KR)

(72) Inventors: Yong Sun Kim, Daejeon (KR); Kap Seok Chang, Daejeon (KR); Young Jo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 940 days.

(21) Appl. No.: 17/517,526

(22) Filed: Nov. 2, 2021

(65) Prior Publication Data

US 2022/0150974 A1    May 12, 2022

(30) Foreign Application Priority Data

Nov. 6, 2020 (KR) ........................ 10-2020-0148129
Jul. 19, 2021 (KR) ........................ 10-2021-0094452
Oct. 1, 2021 (KR) ........................ 10-2021-0131011

(51) Int. Cl.
    *H04W 74/0833*    (2024.01)
(52) U.S. Cl.
    CPC ............................ *H04W 74/0833* (2013.01)
(58) Field of Classification Search
    CPC ........... H04W 74/0833; H04W 74/006; H04W 56/001; H04W 76/11; H04W 74/002
    See application file for complete search history.

(56) References Cited

U.S. PATENT DOCUMENTS

| | | |
|---|---|---|
| 8,559,382 B2 | 10/2013 | Kim et al. |
| 9,363,828 B2 | 6/2016 | Fischer et al. |
| 9,894,684 B2 | 2/2018 | Park et al. |
| 10,805,964 B2 | 10/2020 | Jung et al. |
| 10,869,339 B2 | 12/2020 | Christoffersson et al. |
| 2009/0303919 A1* | 12/2009 | Kang .................... H04B 7/2606 370/315 |
| 2010/0103889 A1* | 4/2010 | Kim .................. H04W 74/0866 370/328 |

(Continued)

FOREIGN PATENT DOCUMENTS

| | | |
|---|---|---|
| KR | 101424258 B1 | 8/2014 |
| KR | 1020170004061 A | 1/2017 |

*Primary Examiner* — Ivan O Latorre
(74) *Attorney, Agent, or Firm* — Rabin & Berdo, P.C.

(57) ABSTRACT

An operation method of a terminal in a communication system may comprise: receiving, from a first base station, information on preambles for random access; transmitting, to the first base station, a first message including a preamble selected based on the information on the preambles; receiving, from the first base station, a second message that is a response signal for the first message; transmitting, to the first base station, a third message requesting a preemptive use of the selected preamble during a first preemptive use period; and receiving, from the first base station, a fourth message allowing the preemptive use of the selected preamble during the first preemptive use period, and performing a random access procedure by using the selected preamble during the first preemptive use period.

16 Claims, 15 Drawing Sheets

(56) References Cited

U.S. PATENT DOCUMENTS

| | | | |
|---|---|---|---|
| 2010/0195636 A1* | 8/2010 | Nakashima | H04W 74/0838 455/450 |
| 2012/0172048 A1* | 7/2012 | Kato | H04W 74/0838 455/450 |
| 2016/0286602 A1* | 9/2016 | Ljung | H04W 76/28 |
| 2017/0208619 A1* | 7/2017 | Yang | H04W 72/21 |
| 2017/0303303 A1* | 10/2017 | Yang | H04W 72/0453 |
| 2018/0184468 A1* | 6/2018 | Chien | H04W 72/30 |
| 2018/0288810 A1* | 10/2018 | Ishii | H04W 48/12 |
| 2019/0141546 A1* | 5/2019 | Zhou | H04L 5/001 |
| 2019/0200391 A1* | 6/2019 | Li | H04W 16/14 |
| 2019/0261388 A1 | 8/2019 | Yoon et al. | |
| 2020/0015285 A1* | 1/2020 | Shin | H04W 74/006 |
| 2020/0137805 A1* | 4/2020 | Tu | H04W 74/0833 |
| 2020/0221533 A1* | 7/2020 | Ljung | H04W 76/27 |
| 2020/0359415 A1 | 11/2020 | Park et al. | |
| 2020/0413452 A1 | 12/2020 | Ishii | |
| 2021/0029658 A1 | 1/2021 | Mahalingam et al. | |
| 2021/0051706 A1* | 2/2021 | Yang | H04W 74/04 |
| 2021/0100029 A1* | 4/2021 | Lei | H04W 74/0833 |
| 2021/0227508 A1* | 7/2021 | Lee | H04W 72/02 |
| 2022/0150974 A1* | 5/2022 | Kim | H04W 74/0833 |
| 2022/0191901 A1* | 6/2022 | Breuer | H04W 72/535 |
| 2022/0256418 A1* | 8/2022 | Kawasaki | H04W 74/08 |
| 2022/0303083 A1* | 9/2022 | Choi | H04L 1/0007 |
| 2023/0007702 A1* | 1/2023 | Park | H04L 5/0094 |
| 2023/0156802 A1* | 5/2023 | Elshafie | H04L 1/1812 370/329 |
| 2024/0121634 A1* | 4/2024 | Zhou | H04L 5/001 |

\* cited by examiner

FIG. 4

| preemptive preamble use request (1 bit) | —410 |
| preemptive preamble retention time (ms) | —420 |

FIG. 5

| preemptive preamble use permission (1 bit) | —510 |
| preemptive preamble retention time permission (1bit) | —520 |
| preemptive preamble index (optional) | —530 |
| preemptive preamble retention time (optional) | —540 |

| ID number | UL grant |
|---|---|
| ID 1 (e.g., C-RNTI 1) | information of a message 2 for ID 1 |
| ID 2 (e.g., C-RNTI 2) | information of a message 2 for ID 2 |
| ID 3 (e.g., C-RNTI 3) | information of a message 2 for ID 3 |

METHOD AND APPARATUS FOR ACQUIRING AND MAINTAINING SYNCHRONIZATION IN COMMUNICATION SYSTEMS

CROSS-REFERENCE TO RELATED APPLICATIONS

This application claims priority to Korean Patent Applications No. 10-2020-0148129, filed on Nov. 6, 2020, No. 10-2021-0094452 filed on Jul. 19, 2021, and No. 10-2021-0131011 filed on Oct. 1, 2021 with the Korean Intellectual Property Office (KIPO), the entire contents of which are hereby incorporated by reference.

BACKGROUND

1. Technical Field

The present disclosure relates to a technique for acquiring and maintaining synchronization in a communication system, and more particularly, to a technique for acquiring and maintaining synchronization in a communication system, which makes it possible to acquire uplink synchronization through a random access procedure or the like and maintain the synchronization during a predetermined time.

2. Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

In such the wireless communication technology, when a power is turned on, a terminal may perform a cell search operation, and may select a base station to which it is to access through information periodically broadcasted by adjacent base stations. In addition, the terminal may obtain information on a time point for initial access and preambles that can be used for the initial access from the information broadcast by the base station. Thereafter, the terminal may select a preamble from among the available preambles, and transmit the selected preamble to the base station to initiate a random access procedure. In this case, when a large number of terminals access the base station by using the same preamble, a collision (i.e., contention) may occur, and it may be difficult for the base station to restore the received preamble. In particular, in case of an application with a large number of terminals, several terminals may select the same preamble for simultaneous accesses, and a collision of preambles may occur frequently. As such, when the preamble collision occurs frequently, retransmission of preambles of the terminals may increase, and thus there may be a problem in that the possibility of the preamble collision further increases. Therefore, it may be important for the wireless communication system to reduce the occurrences of such the preamble collisions in applications where the initial access possibility is important. In addition, a dedicated preamble specified in the existing 3GPP technical specifications is assigned by the base station to the terminal according to a determination result of the base station in a non-initial state, and thus, there may be a limitation in rapidly reflecting the state of the terminal that changes from moment to moment.

SUMMARY

Accordingly, exemplary embodiments of the present disclosure are directed to providing methods and apparatuses for acquiring and maintaining synchronization in a communication system, which reduces a possibility of collision between preambles by acquiring uplink synchronization through a random access procedure and maintaining the uplink synchronization for a predetermined time.

According to a first exemplary embodiment of the present disclosure, an operation method of a terminal in a communication system may comprise: receiving, from a first base station, information on preambles for random access; transmitting, to the first base station, a first message including a preamble selected based on the information on the preambles; receiving, from the first base station, a second message that is a response signal for the first message; transmitting, to the first base station, a third message requesting a preemptive use of the selected preamble during a first preemptive use period; and receiving, from the first base station, a fourth message allowing the preemptive use of the selected preamble during the first preemptive use period, and performing a random access procedure by using the selected preamble during the first preemptive use period.

The operation method may further comprise, when the first base station does not allow the preemptive use during the first preemptive use period, receiving a fifth message allowing the preemptive use of the selected preamble during a second preemptive use period, and performing a random access procedure by using the selected preamble during the second preemptive use period.

The operation method may further comprise, when the first base station does not allow the preemptive use of the selected preamble, receiving a fifth message allowing a preemptive use of an alternative preamble during the first preemption use period, and performing a random access procedure by using the alternative preamble during the first preemptive use period.

The operation method may further comprise, when the first base station does not allow the preemptive use of the selected preamble during the first preemptive use period, receiving a fifth message allowing a preemptive use of an alternative preamble during a second preemptive use period, and performing a random access procedure by using the alternative preamble during the second preemptive use period.

The first message and the third message may be combined and transmitted to the first base station as a message A, and the second message and the fourth message may be combined and received from the first base station as a message B.

The operation method may further comprise: starting a procedure for handover to a second base station; receiving a sixth message allowing a preemptive use of the selected preamble from the second base station; and performing a random access procedure with the second base station by using the selected preamble.

The operation method may further comprise: starting a procedure for handover to a second base station; receiving a sixth message allowing a preemptive use of an alternative preamble other than the selected preamble from the second base station; and performing a random access procedure with the second base station by using the alternative preamble.

The information on the preambles may include masked preamble index(es) indicating preamble(s) that are not allowed to be used, and the selected preamble may be selected from preambles excluding the preamble(s) indicated by the masked preamble index(es).

The operation method may further comprise: determining whether to return to a cooperative work in a radio resource control (RRC) connected-inactive state; in response to determining to return to the collaborative work, transitioning to an RRC connected state; and acquiring inter-terminal clock synchronization by transmitting the selected preamble to the first base station.

According to a second exemplary embodiment of the present disclosure, an operation method of a first base station in a communication system may comprise: transmitting, to a terminal, information on preambles for random access; receiving, from the terminal, a first message including a preamble selected based on the information on the preambles; transmitting, to the terminal, a second message that is a response signal for the first message; receiving, from the terminal, a third message requesting a preemptive use of the selected preamble during a first preemptive use period; and transmitting, to the terminal, a fourth message allowing the preemptive use of the selected preamble during the first preemptive use period.

The operation method may further comprise, when the first base station does not allow the preemptive use during the first preemptive use period, transmitting, to the terminal, a fifth message allowing the preemptive use of the selected preamble during a second preemptive use period.

The operation method may further comprise, when the first base station does not allow the preemptive use of the selected preamble, transmitting, to the terminal, a fifth message allowing a preemptive use of an alternative preamble during the first preemption use period.

The operation method may further comprise, when the first base station does not allow the preemptive use of the selected preamble during the first preemptive use period, transmitting, to the terminal, a fifth message allowing a preemptive use of an alternative preamble during a second preemptive use period.

The first message and the third message may be combined and received from the terminal as a message A, and the second message and the fourth message may be combined and transmitted to the terminal as a message B.

The operation method may further comprise: starting a procedure for handover of the terminal to a second base station; and transmitting information on the selected preamble to the second base station.

The operation method may further comprise: setting an index of the selected preamble as a masked preamble index; and generating a system information block 2 (SIB2) including the set masked preamble index and transmitting the generated SIB2 to other terminals.

According to a third exemplary embodiment of the present disclosure, an operation method of a terminal in a communication system may comprise: receiving, from a base station, a mapping table indicating a mapping relationship between terminal identifiers (IDs) and preemptive preambles and information on general preambles; selecting a preamble among the general preambles and the preemptive preambles by referring to the mapping table, and transmitting a first message including the selected preamble to the base station; receiving, from the base station, a second message that is a response signal for the first message; transmitting, to the base station, a third message including a radio resource control (RRC) connection request; and receiving, from the base station, a fourth message including RRC connection setup in response to the third message.

The selecting of the preamble and the transmitting of the first message may comprise: searching for a terminal ID of the terminal in the mapping table; determining a preemptive preamble mapped to the terminal ID in the mapping table as the selected preamble; and transmitting the first message including the selected preamble to the base station.

The operation method may further comprise: when the terminal ID of the terminal does not exist in the mapping table, selecting one preamble from the general preambles, and determining the one preamble as the selected preamble; and transmitting the first message including the selected preamble to the base station.

The terminal IDs may be cell radio network temporary identities (C-RNTIs) previously used by terminals corresponding to the terminal IDs.

According to the present disclosure, a terminal can perform a random access procedure by exclusively using a previously used preamble, so that synchronization with a base station can be quickly acquired. In addition, according to the present disclosure, since the terminal can perform a random access procedure by using a preamble (i.e., preemptive preamble) allocated in advance by the base station, a contention resolution procedure may be unnecessary, and thus, it is made possible to quickly access the base station. In addition, according to the present disclosure, as random access procedures are performed by using preambles that can be exclusively used by terminals, respectively, a large number of terminals can access the base station without contentions in a situation where the random access procedures of the terminals are required. Further, according to the present disclosure, when there are a large number of terminals in the random access situation and the probability of contention is high, the contentions can be reduced by allowing the terminals to access the base station through uplink grant information. In addition, according to the present disclosure, it is made possible to quickly acquire synchronization in a system connected state, so that applications requiring high absolute synchronization performance such as factory automation can be satisfied. Further, according to the present disclosure, since the terminal is allocated a preamble (i.e., preemptive preamble) that can be used exclusively for transmission of a physical random access channel (PRACH), immediate terminal-driven timing synchronization update may be possible without additional message exchanges.

BRIEF DESCRIPTION OF DRAWINGS

FIG. 4 is a conceptual diagram illustrating a first exemplary embodiment of a preemptive preamble option format.

FIG. 5 is a conceptual diagram illustrating a first exemplary embodiment of a preemptive preamble response format.

DETAILED DESCRIPTION OF THE EMBODIMENTS

Figure 1:
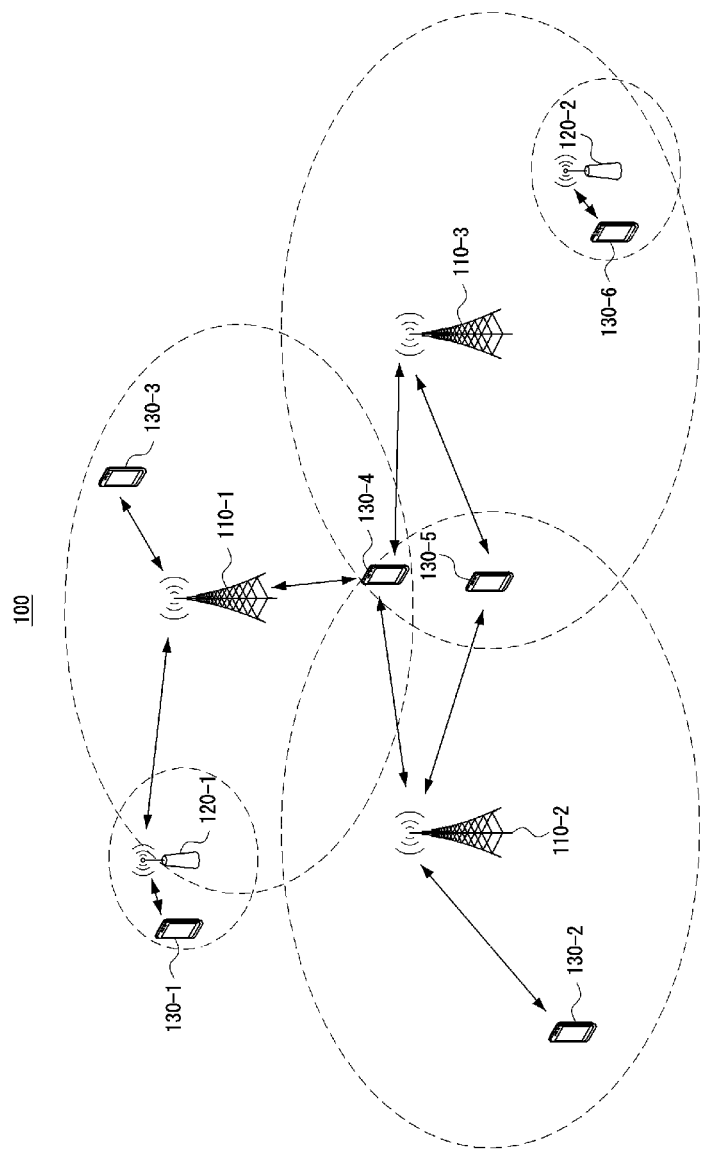
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support at least one communication protocol. For example, each of the plurality of communication nodes 110 to 130 may support communication protocols defined in the 3rd generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
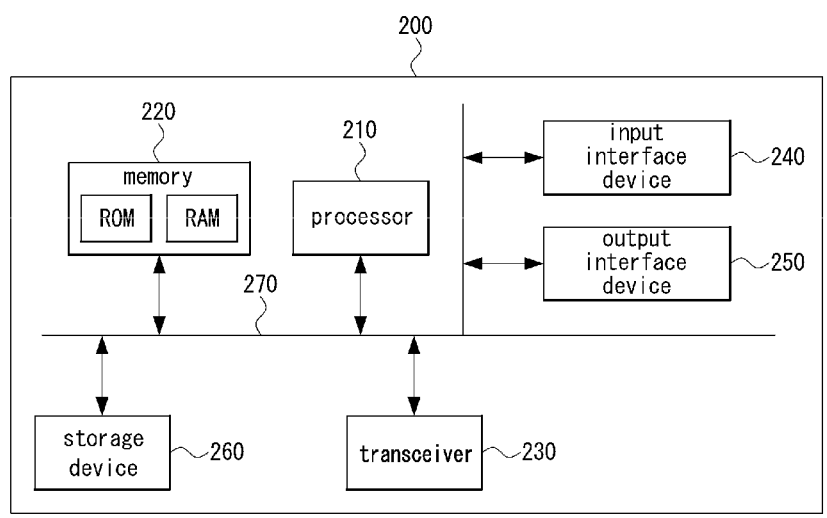
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270. However, the respective components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), etc.) defined in the 3rd generation partnership project (3GPP) specification. Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner. Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, in such the communication system, an initial access procedure may include a step in which a terminal transmits a preamble to a base station through a message 1, a step in which the base station responds to the message 1 to the terminal through a message 2, a step in which the terminal requests a resource for transmission from the base station through a message 3, and a step in which the base station transmits resource allocation information to the terminal through a message 4 and completes the initial access. In this case, if a collision occurs in transmission of the message 1, the terminal may proceed with retransmission of the message 1. According to the 4G LTE and 5G NR, the base station may allocate a portion of 64 preambles as preambles for the initial access. In this case, when the number of terminals is large, many terminals may select the same preamble, and simultaneous accesses using the same selected preamble may increase, so that collisions due to the same preamble may occur frequently. If the collisions due to the same preamble occur frequently, the number of times that the terminals retransmits preambles also increases, which may also increase possibility of collisions. Therefore, it may be important for the wireless communication system to reduce the occurrence of such the preamble collisions in applications where the initial access probability is important.

The terminal may enter a state of being connected with the system after the initial access, and may communicate with the connected base station. In this case, since the terminal uses radio resources allocated by the base station, it may transmit and receive data reliably without collisions. However, when the connected state is poor due to a decrease in signal-to-noise ratio (SNR) according to a movement of the terminal or a change in a surrounding environment, procedures for recovering or re-establishing the connection may be required. Specifically, the random access procedure defined in the 3GPP specifications may be performed in the following cases.

(1) A terminal that is not uplink (UL)-synchronized needs to receive downlink (DL) data
(2) A terminal in a system connected state, that exceeds an uplink synchronization allowable range, wants to transmit new uplink data
(3) A terminal in a system connected state handovers from a current serving cell to a target cell
(4) A terminal in a system connected state needs a timing advance (TA) for a purpose of positioning
(5) A terminal in an RRC idle state (RRC IDLE state) transitions to a RRC connected state (RRC_CONNECTED state)
(6) A terminal re-establishes a connection after a radio link failure (RLF)

In the case (3) described above, when the terminal performs handover from the serving cell to the target cell, a preamble for handover access may be allocated in advance from the target cell base station, and the access procedure may be performed on a contention-free basis. However, when preambles reserved for handover access are not sufficient, the terminal may perform the handover by using a contention-based access preamble of the target cell.

In applications such as factory automation where a terminal needs to maintain high synchronization accuracy with a base station, the terminal may need to quickly restore frequency synchronization. The conventional wireless communication technology may use a method of re-accessing by selecting an arbitrary preamble when the connection is unreliable. However, in this case, if the terminal proceeds with the initial access procedure again, it may not be suitable for applications such as factory automation requiring high absolute time synchronization (ATS) (i.e., all devices share the same time) due to an increase in possibility of collisions due to the use of a random preamble. In this reason, the terminal may request a dedicated preamble from the base station in advance, and perform the access procedure by using the dedicated preamble. However, even in this case, a procedure for the terminal to request the preamble in advance may be required, and if synchronization is already lost, a situation may arise in which the request itself cannot be performed. Therefore, the wireless communication technology requires procedures and methods to satisfy such the ATS requirements in any situations in the applications such as the factory automation.

Accordingly, for the applications with the high ATS requirements, such as factory automation, where a reliable wireless connection should be maintained, the present disclosure may provide a method for satisfying uplink synchronization performance of the terminals. In general, the ATS requirements may be satisfied through an absolute time synchronization procedure, downlink synchronization, uplink synchronization, and the like, so that the uplink synchronization should be included in the ATS requirements. In addition, the present disclosure may provide a method of solving the problem in which the terminals cannot receive timely services due to a large access time delay according to an increase in collision probability when a large number of terminals simultaneously attempt random accesses to the wireless communication system through uplink. Hereinafter, the factory automation will be described as a use case, but this is only for convenience of description, and exemplary embodiments of the present disclosure are not limited thereto.

Figure 3:
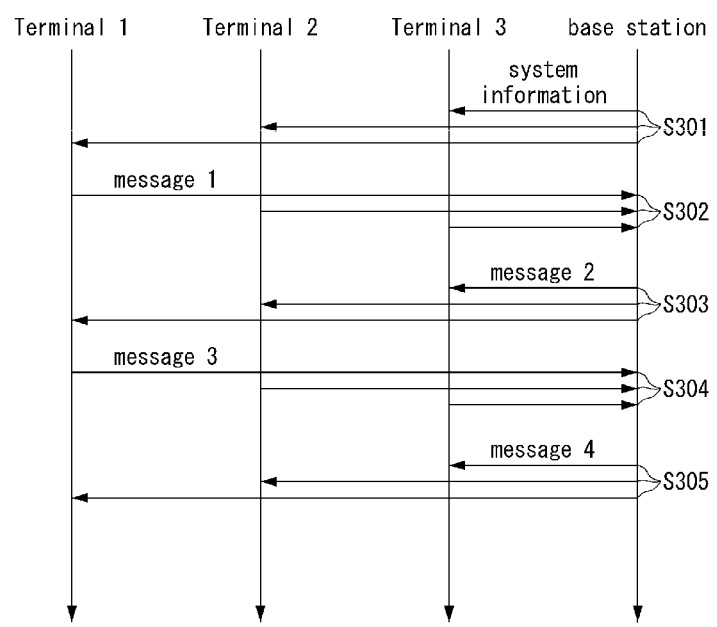
FIG. 3 is a sequence chart illustrating a first exemplary embodiment of a method for acquiring and maintaining synchronization in a communication system.

FIG. 3 is a sequence chart illustrating a first exemplary embodiment of a method for acquiring and maintaining synchronization in a communication system.

Referring to FIG. 3, in a method for acquiring and maintaining synchronization in a communication system, the base station may periodically broadcast system information by using a broadcast channel (BCH) so that terminals wanting to newly access the base station can perform a cell search procedure (S301). In this case, in the broadcast system information, physical random access channel (PRACH) related information required when the terminals access the base station may include a PRACH configuration index parameter (prach-ConfigurationIndex), a PRACH frequency offset parameter (prach-FrequencyOffset), a preamble retransmission count parameter (numRepetitionPerPreambleAttempt), a PRACH start subframe parameter (prach-StartingSubframe), and the like. Among these parameters, the PRACH configuration index parameter may be a parameter informing a slot number, a start symbol, a preamble format, etc. of a preamble that the terminals uses to transmit the message 1 to the base station. In the case of 4G and 5G, the number of preambles that the base station can allocate to terminals may be about 64, and if about 10% of them are reserved for handover purposes, about 58 preambles may be allocated for random access purposes. The number of preambles that the base station allocates for random access of terminals may depend on configuration of the base station.

Accordingly, each of the terminals may obtain the PRACH configuration index parameter from the system information, select one from the available preambles, and transmit the message 1 to the base station in a random access period (S302). In this case, when several terminals simultaneously select and transmit the same preamble to the base station, collisions may occur and restoration of the preamble may not be possible in the base station. In this case, if each of the terminals does not receive the message 2 corresponding to itself, that is a PRACH response message, from the base station, it may perform retransmissions of the preamble. If the preambles which the terminals have transmitted arrive at the base station without collisions, and the terminals receive the message 2 as responses to the preambles, each of the terminals may transmit a message 3, which is an RRC connection request message, to the base station (S303). The message 2 transmitted by the base station to each of the terminals in response to the message 1 may include timing advance (TA) information for synchronizing uplink timing, a temporary cell identifier (i.e., temporary cell radio network temporary identity (TC-RNTI)), and the like. Accordingly, each of the terminals may transmit the message 3, that is an RRC connection request message, to the base station by using the TA information and the temporary cell identifier, which are received from the base station, and a resource allocated for transmission, which is included in an uplink grant (S304). In this case, the terminal may include a preemptive preamble use request in the message 3 when transmitting the message 3 to the base station. As a method for the terminal to notify the base station of the preemptive preamble use request, a preemptive preamble option maybe added to the message 3. A format of the preemptive preamble option may be as shown in FIG. 4.

FIG. 4 is a conceptual diagram illustrating a first exemplary embodiment of a preemptive preamble option format.

Referring to FIG. 4, a preemptive preamble option format may include a 1-bit preemptive preamble use request field 410 and a preemptive preamble retention time field 420. Here, the terminal may request the base station to allow the terminal to use a preemptive preamble by indicating the preemptive preamble use request field as '1' as an example. In addition, the terminal may transmit to the base station by indicating a predetermined time for which the terminal wants to use a preemptive preamble in the preemptive preamble retention time field. As such, the terminal may request the base station to allow the terminal to use a preemptive preamble by adding the preemptive preamble option according to the preemptive preamble option format to the message 3. In this case, the terminal may not indicate the preemptive preamble retention time. In this case, the base station may set the preemptive preamble retention time as a default value. Alternatively, the base station may set the preemptive preamble retention time to infinity as a default value. In this case, release of the preemptive preamble may be performed by the terminal or the base station through a preemptive preamble release message. On the other hand, the terminal may use bits of reserved field(s) as the preemptive preamble option fields without adding the preemptive preamble option fields to the message 3. For example, the terminal may set a corresponding bit to '1' to request the base station to allow to use the currently-used access preamble as a dedicated preemptive preamble even in the system connected state. In this case, the base station may inform the terminal of the retention time of the preemptive preamble or the terminal may use a preset timer setting value.

Referring again to FIG. 3, when the base station receives the message 3 including the preemptive preamble use request from the terminal, in response to the messages 3, the base station may transmit a messages 4 for RRC connection setup and contention resolution to complete the random access procedure (S305). In this case, the base station may transmit the messages 4 by including information indicating whether the use of the preemptive preamble is allowed or not to the terminal. In addition, the base station may reserve the preamble used for random access by the terminal to continue to be used even in the system connected state. In addition, the base station may delete the preemptive preamble from the preamble list or notify that the preemptive preamble is being used dedicatedly when broadcasting system information in order to prevent other terminals that initially access later from using the corresponding preamble. Accordingly, if the terminal needs to improve or maintain synchronization immediately or periodically even in the connected state after the initial access due to very high uplink synchronization requirements, the preamble selected and used by the terminal at the time of initial access may continue to be used after the access procedure. Here, although exemplary embodiments where the preamble is preempted, the present disclosure is not limited thereto, and all other signals available for synchronization may be used as the targets of preemption.

On the other hand, the base station may not allow the use of the preamble when it receives the preemptive preamble use request from the terminal. Alternatively, when the base station receives the request to use the preemptive preamble from the terminal, the base station may use the message 4 including a preemptive preamble response according to a preemptive preamble response format of FIG. 5 to allow the terminal to use another preamble (i.e., alternative preamble). In addition, when the base station receives the preemptive preamble use request from the terminal, the base station may allow the terminal to use another preemptive preamble retention time by using the message 4 including a preemptive preamble response according to the preemptive preamble response format of FIG. 5.

FIG. 5 is a conceptual diagram illustrating a first exemplary embodiment of a preemptive preamble response format.

Referring to FIG. 5, a preemptive preamble response format may include a 1-bit preamble use permission field 510, a 1-bit preemptive preamble retention time permission field 520, a preemptive preamble index field 530, and a preemptive preamble retention time field 540. The base station may indicate that the use of the preemptive preamble is allowed in the preemptive preamble use permission field 510 in order to allow the terminal to use the requested preemptive preamble (e.g., the field may be set to '1'). In this case, the base station may not need to additionally inform the terminal of the index of the preemptive preamble through the preemptive preamble index field 530. Accordingly, the terminal may recognize that the use of the preemptive preamble is allowed through the preemptive preamble use permission field 510, and may access the base station by using the preemptive preamble for which dedicated use is allowed by the base station. Alternatively, the base station may indicate that use of a preamble other than the preemptive preamble requested by the terminal is allowed by setting the preemptive preamble use permission field (e.g., the field is set to '1'), and including an index of a preamble (i.e., alternative preamble) other than the preamble used for initial access by the terminal in the preemptive preamble index field 530. Accordingly, the terminal may recognize that the use of the preemptive preamble is allowed through the preemptive preamble use permission field 510, identify the index of the preemptive preamble allocated by the base station through the preemptive preamble index field 530, and access the base station by using the preemptive preamble according to the identified index.

On the other hand, the base station may indicate that the use of the preemptive preamble retention time is allowed in the preemptive preamble retention time permission field 520 in order to allow the terminal to use the preemptive preamble retention time requested by the terminal (e.g., the field may be set to '1'). In this case, the base station may not need to additionally inform the terminal of the preemptive preamble retention time through the preemptive preamble retention time field 540. Of course, in this case, the base station may indicate that the use is allowed in the preemptive preamble use permission field 510 in order to allow the terminal to use the requested preemptive preamble (e.g., the field may be set to '1'). Accordingly, the terminal may recognize that the use of the requested preemptive preamble retention time is allowed through the preemptive preamble use permission field 510, and may use the preemptive preamble during the preemptive preamble retention time requested by the terminal to access the base station. Alternatively, the base station may indicate that the use is allowed in the preemptive preamble retention time permission field 520 (e.g., the field may be ser to '1') in order to allow the terminal to use a preemptive preamble retention time different from the preemptive preamble retention time requested by the terminal, and may indicate the preemptive preamble retention time different from the preemptive preamble retention time requested by the terminal. Of course, in this case, the base station may indicate that the use is allowed in the preemptive preamble use permission field 510 in order to allow the terminal to use the requested preemptive preamble (e.g., the field may be set to '1'). Accordingly, the terminal may recognize that use of the preemptive preamble retention time is allowed through the preemptive preamble retention time permission field 520, and may use the preemptive preamble to access the base station during the preemptive preamble retention time allocated by the preemptive preamble retention time field 540. Here, the base station may directly inform the preemptive preamble retention time as a method of informing the terminal of the preemptive preamble retention time. Alternatively, the base station may inform the preemptive preamble retention time by using an index indicating the preemptive preamble retention time. On the other hand, when the base station does not allow the use of the preemptive preamble, the base station may indicate this in the preemptive preamble use permission field 510 (e.g., the field may be ser to '0'), and transmit it to the terminal. Then, the terminal may ignore the preemptive preamble retention time permission field 520, the preemptive preamble index field 530, and the preemptive preamble retention time field 540 in the preemptive preamble response, and may not exclusively use the preemptive preamble requested by the terminal.

Meanwhile, when the terminal receive the message 4 including the preemptive preamble response of FIG. 5, the terminal may first identify the preemptive preamble use permission field 510. If the preemptive preamble use permission field indicates a bit (e.g., '0') informing that the use of the preemptive preamble is not allowed, the terminal may ignore other fields 520, 530, and 540. On the other hand, if the preemptive preamble use permission field 510 indicates a bit (e.g., '1') informing that the use of the preemptive preamble is allowed, the terminal may identify whether a preemptive preamble index is included in the preemptive preamble index field 530. If a preemptive preamble index is not included in the preemptive preamble index field 530, the terminal may access the base station by using the preemptive preamble for which dedicated use has been requested (i.e., the preamble used in the initial access procedure). On the other hand, if a preemptive preamble index is included in the preemptive preamble index field 530, the terminal may access the base station by using a preemptive preamble according to the included preemptive preamble index. On the other hand, if the preemptive preamble use permission field 510 indicates a bit (e.g., '1') informing that use of the preemptive preamble is allowed, the terminal may identify the preemptive preamble retention time permission field 520. As a result of the identification, if the preemptive preamble retention time permission field 520 indicates a bit (e.g., '1') informing that the preemptive preamble retention time is allowed, the terminal may identify the preemptive preamble retention time field 540 to identify whether a preemptive preamble retention time is included in the preemptive preamble retention time field 540. In this case, if a preemptive preamble retention time is not included in the preemptive preamble retention time field 540, the terminal may access the base station by using the preemptive preamble retention time requested by the terminal. On the other hand, if a preemptive preamble retention time is included in the preemptive preamble retention time field 540, the terminal may access the base station by using the preemptive preamble for a time according to the included preemptive preamble retention time. Meanwhile, although the above-described method for acquiring and maintaining synchronization in the communication system has been described through a 4-step random access procedure, it may also be implemented through a 2-step random access procedure.

Figure 6:
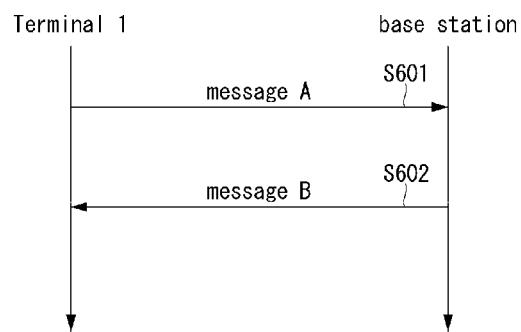
FIG. 6 is a sequence chart illustrating a second exemplary embodiment of a method for acquiring and maintaining synchronization in a communication system.

FIG. 6 is a sequence chart illustrating a second exemplary embodiment of a method for acquiring and maintaining synchronization in a communication system.

Referring to FIG. 6, in a method of acquiring and maintaining synchronization in a communication system, the terminal may transmit a message A to the base station by adding a preamble request option (S601). Here, the message A may be configured as a combination of the message 1 and the message 3 of the 4-step random access procedure. Then, when the base station transmits a message B to the terminal in response to the message A, the message B may be transmitted by adding a preemptive preamble response to the message B (S602). Here, the message B may be configured as a combination of the message 2 and the message 4 of the 4-step random access procedure.

Figure 7:
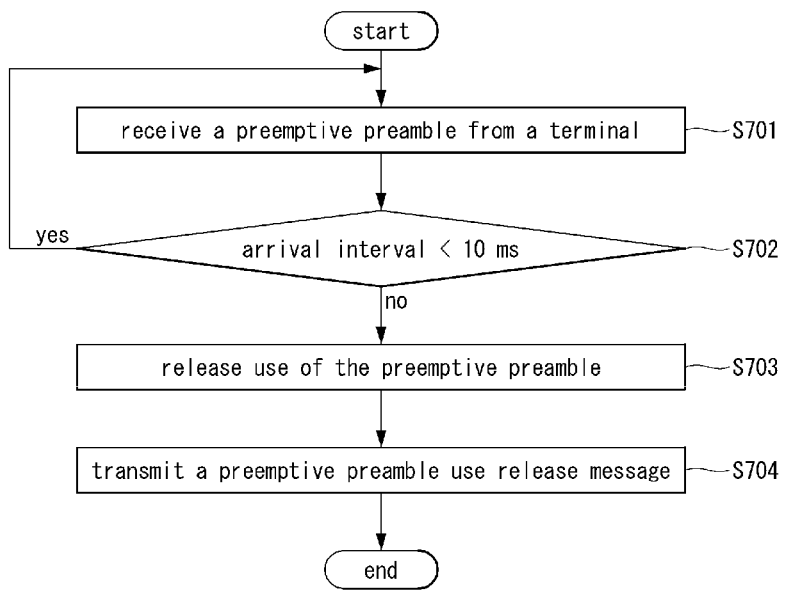
FIG. 7 is a flowchart illustrating a first exemplary embodiment of a method for configuring and managing a preemptive preamble in a base station.

FIG. 7 is a flowchart illustrating a first exemplary embodiment of a method for configuring and managing a preemptive preamble in a base station.

Referring to FIG. 7, in a method for configuring and managing a preemptive preamble in a base station, the base station may receive a preemptive preamble from the terminal (S701). In this case, the base station may set a preemptive preamble retention time to 10 ms. Accordingly, the base station may determine whether an arrival interval of the preemptive preamble is within 10 ms, which is the preemptive preamble retention time (S702). As a result of the determination, if the arrival interval of the preemptive preamble is within the preemptive preamble retention time, the base station may repeat from the step S701 of receiving the preemptive preamble. On the other hand, if it is determined that the arrival interval of the preemptive preamble is not within the preamble retention time, the base station may release the preemptive use of the preamble (S703), and may generate and transmit a preemptive preamble release message to the terminal (S704).

As described above, in FIG. 7, the base station releases the preemptive use of the preamble when the preemptive preamble does not arrive from the terminal within the preemptive preamble retention time. However, it may also be possible to release the preemptive use of the preamble in consideration of the usage and priority of the currently available preambles, even before the preemptive preamble retention time does not end. When the base station releases the preemptive use of the preamble, if the base station releases the preamble before the retention time of the preamble ends, the base station may transmit a preemptive preamble use release message to the terminal. If the base station releases the preemptive use of the preamble after the preemptive preamble retention time ends, it may or may not be necessary to explicitly transmit the preemptive preamble use release message to the terminal. This may not be a problem because the terminal has information on the preemptive preamble retention time and can easily manage it. However, when the base station needs to release the preemptive use of the preamble before the preemptive preamble retention time ends, the base station may explicitly inform the terminal through the preemptive preamble use release message, or the like. On the other hand, if the terminal no longer needs to preemptively use the preemptive preamble, it may transmit the preamble preemptive use release message to the base station. In addition, when the terminal wants to continuously dedicatedly use the preemptive preamble, the terminal may transmit a preamble preemptive use retention message within the preemptive preamble retention time (e.g., 10 ms) or by setting the retention time to infinity. In this case, the base station may determine whether to allow the retention time requested by the terminal and inform the terminal. Meanwhile, the base station may provide preambles for preventing collision when various terminals having different requirements simultaneously attempt random accesses.

Figure 8:
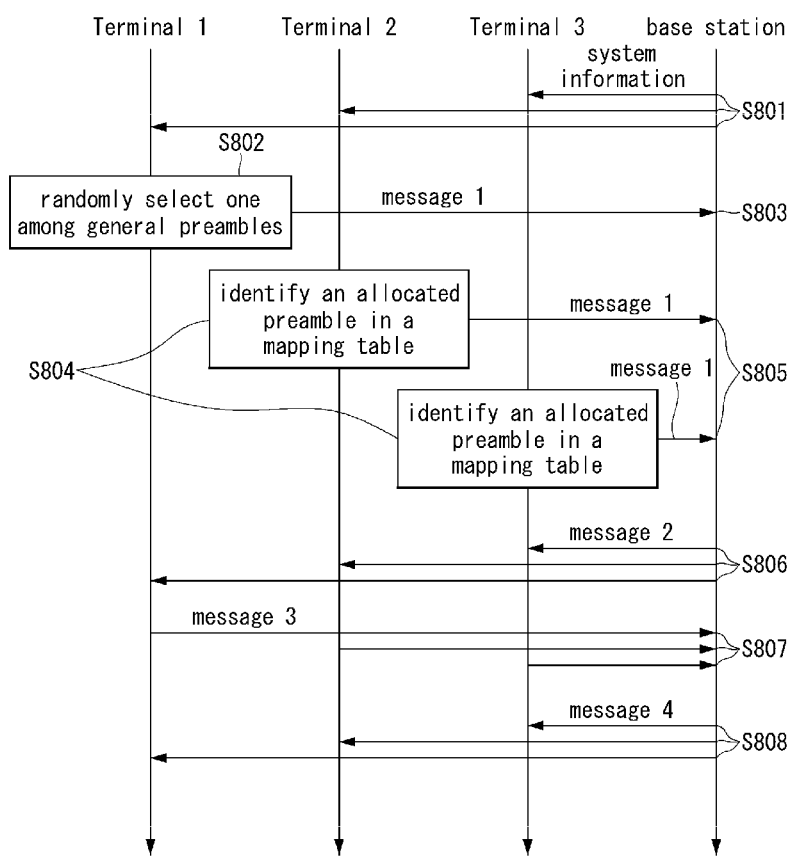
FIG. 8 is a sequence chart illustrating a third exemplary embodiment of a method for acquiring and maintaining synchronization in a communication system.

FIG. 8 is a sequence chart illustrating a third exemplary embodiment of a method for acquiring and maintaining synchronization in a communication system.

Referring to FIG. 8, in a method for acquiring and maintaining synchronization in a communication system, for terminals 2 and 3, which frequently maintain connections with the base station from the past, the base station may broadcast an ID-preamble mapping table including preambles continuously usable by the terminals 2 and 3 and IDs (e.g., C-RNTIs) used by the terminals 2 and 3 on a BCH by including the ID-preamble mapping table in system information (S801). In this case, an example of the ID-preamble mapping table used by the base station may be shown in FIG. 9.

Figure 9:
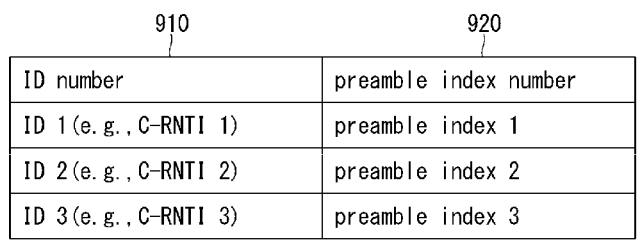
FIG. 9 is a conceptual diagram illustrating a first exemplary embodiment of an ID-preamble mapping table.

FIG. 9 is a conceptual diagram illustrating a first exemplary embodiment of an ID-preamble mapping table.

Referring to FIG. 9, the ID-preamble mapping table may include an ID number field 910 and a preamble index number field 920. Here, the ID number field 910 may indicate the ID of each terminal, and for example, the C-RNTI used by the terminal in the previous connection may be indicated. In addition, the preamble index number field 920 may indicate an index number of a preamble that can be used by each terminal. For example, a terminal having an ID 1 (e.g., C-RNTI 1) may use a preamble index 1, a terminal having an ID 2 (e.g., C-RNTI 2) may use a preamble index 2, and a terminal having an ID 3 (e.g., C-RNTI 3) may use a preamble index 3.

Referring again to FIG. 8, terminals 1 to 3 may receive system information including the ID-preamble mapping table from the base station. Then, the terminal 1, which does not frequently maintain connection with the base station, may randomly select one from the remaining general preambles excluding the preambles included in the ID-preamble mapping table (S802), and may transmit the selected preamble to the base station through the message 1 to attempt a contention-based random access (S803). On the other hand, each of the terminals 2 and 3, which frequently maintain connections with the base station, may identify the preemptive preamble assigned to it through the ID-preamble mapping table (S804), and may generate the message 1 by using the identified preamble and transmit it to the base station to attempt a random access (S805).

In this manner, the terminals 2 and 3 may exclusively use the preemptive preambles, so that they can access the base station without collision. Thereafter, the base station may transmit the message 2 to each of the terminals 1 to 3 in response to the message 1 (S806). Each of the terminals 1 to 3 may transmit the message 3 to the base station in response to the message 2 (S807). Accordingly, the base station may transmit the message 4 to each of the terminals 1 to 3 in response to the message 3 (S808).

Here, the base station may transmit the message 2 and the message 4 together to the terminal 2 and the terminal 3. These may correspond to the message B of the 2-step initial access procedure, and the base station may allocate resources based on buffer status information received from the terminals 2 and 3 in the previous access. Accordingly, the message 2 and message 3 may be omitted in the 4-step access procedure. As a result, the base station, the terminal 2, and the terminal 3 may complete the initial access procedure by using only two messages, that is, the message 1 and the message (i.e., combined message) into which the message 2 and the message 4 are combined. On the other hand, when each of the terminals 2 and 3 additionally transmits the message 1, it may transmit reference signals (RSs) mapped to the ID in addition to the preemptive preamble, thereby improving the uplink synchronization estimation performance. Also, the base station may derive TA information from an estimated synchronization point, and include the TA information in the combined message of the message 2 and the message 4 when transmitting the combined message. On the other hand, although the above-described methods for acquiring and maintaining synchronization are methods that directly use preambles, as shown in FIG. 10 below, the messages 3 and 4 of the 4-step access procedure may be used to acquire and maintain synchronization without using preambles.

Figure 10:
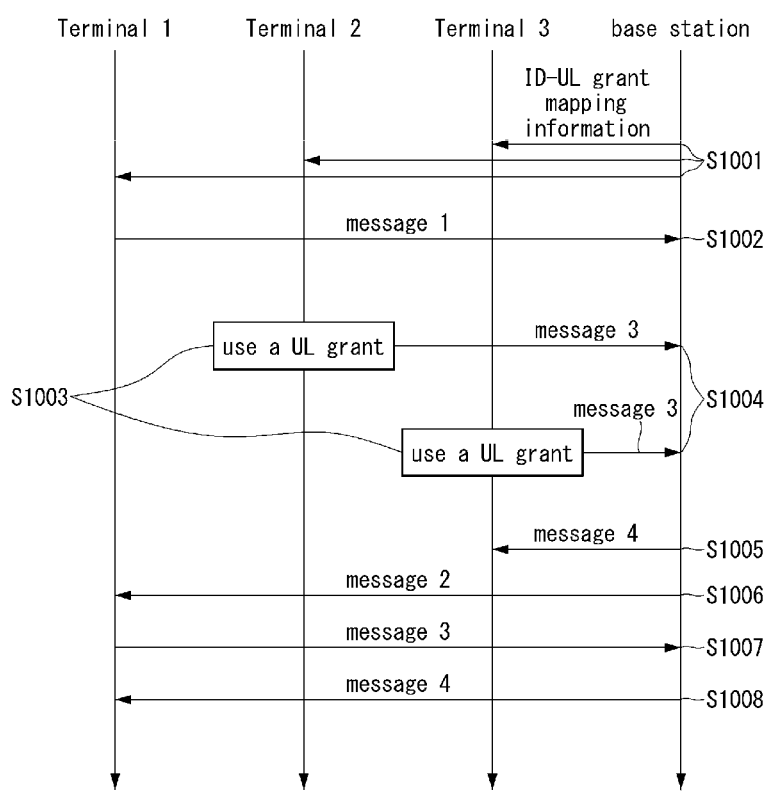
FIG. 10 is a sequence chart illustrating a fourth exemplary embodiment of a method for acquiring and maintaining synchronization in a communication system.

FIG. 10 is a sequence chart illustrating a fourth exemplary embodiment of a method for acquiring and maintaining synchronization in a communication system.

Referring to FIG. 10, in a method of acquiring and maintaining synchronization in a communication system, for terminals 2 and 3, which frequently maintain connections with the base station from the past, the base station may broadcast an ID-UL grant mapping table for mapping UL grants with IDs of the terminals 2 and 3 on a BCH channel (S1001). In this case, an example of the ID-UL grant mapping table used by the base station may be shown in FIG. 11.

Figures 11, 12:
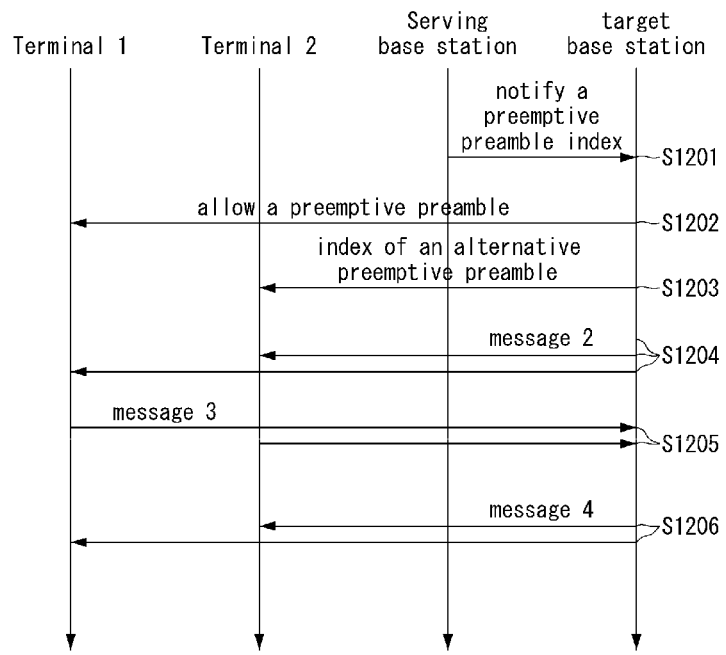
FIG. 11 is a conceptual diagram illustrating a first exemplary embodiment of an ID-UL grant mapping table.
FIG. 12 is a sequence chart illustrating a fifth exemplary embodiment of a method for acquiring and maintaining synchronization in a communication system.

FIG. 11 is a conceptual diagram illustrating a first exemplary embodiment of an ID-UL grant mapping table.

Referring to FIG. 11, the ID-UL grant mapping table may include an ID number field 1110 and a UL grant field 1120. Here, the ID number field 1110 may indicate the ID of each terminal, and for example, the C-RNTI used by the terminal in the previous connection may be indicated. In addition, the UL grant field 1120 may include information of the message 2 for the terminal. Here, the information of the message 2 included in in the UL grant field 1120 may be information on a resource that can be used to transmit the message 3. For example, a terminal having an ID 1 (e.g., C-RNTI 1) may transmit a message 3 by using information of the message 2 for the ID 1 in the UL grant field 1120, a terminal having an ID 2 (e.g., C-RNTI 2) may transmit a message 3 by using information of the message 2 for the ID 2 in the UL grant field 1120, and a terminal having an ID 3 (e.g., C-RNTI 3) may transmit a message 3 by using information of the message 2 for the ID 3 in the UL grant field 1120.

Referring again to FIG. 10, the terminals 1 to 3 may receive the ID-UL grant mapping table broadcast from the base station. Then, the terminal 1, which does not frequently maintain connection with the base station, may randomly select one from general preambles for random access, and may transmit the selected preamble to the base station through the message 1 to attempt a contention-based random access (S1002). On the other hand, each of the terminals 2 and 3, which frequently maintains connection with the base station, may identify a resource granted to it by identifying the information of the message 2 for each terminal included in the ID-UL grant mapping table, and may generate the message 3 to the base station by using the identified allocated resource (S1003). In this manner, the terminals 2 and 3 may omit the steps of message 1 and message 2 in the 4-step access procedure. In this manner, the terminals 2 and 3 may access the base station by using the UL-granted resource, so that access to the base station may be possible without collision. Accordingly, when a large number of terminals exist, the number of collisions for frequently connected terminals can be reduced, thereby increasing the overall success probability for the initial access terminals. Meanwhile, the base station may transmit the message 4 to each of the terminals 2 and 3 in response to the messages 3 received from each of the terminals 2 and 3 (S1005). Of course, the base station may transmit the message 2 to the terminal 1 in response to the message 1 received from the terminal 1 (S1006), and the terminal 1 may transmit the message 3 to the base station in response to the message 2 (S1007). Then, the base station may transmit the message 4 to the terminal 1 in response to the message 3 to complete the initial access procedure with the terminal 1 (S1008).

On the other hand, when each of the terminals 2 and 3 transmits the message 3, it may additionally transmit RSs mapped to the ID, thereby improving the uplink synchronization estimation performance. Also, the base station may derive TA information from an estimated synchronization point, and include the TA information in the message 4 when transmitting the message 4.

It should be noted that the methods for acquiring and maintaining synchronization in the communication system proposed by the present disclosure are not limited to the exemplary embodiments of FIGS. 3, 6, 8, and 10. As mentioned in the prior art and problems, the methods proposed by the present disclosure may be applicable to all of the random access situations defined in the 3GPP specifications. That is, the methods proposed here may be applied to random access in a number of conventional situations.

The first case in which a terminal that is not uplink-synchronized needs to receive downlink data may be an initial access situation for the first situation. Thus, the exemplary embodiments of FIGS. 3, 8, and 10 may be applicable to the first case.

The second case in which a terminal in a system connected state that exceeds an uplink synchronization tolerance range wants to transmit new uplink data may be a situation in which a terminal in a system connected state is continuously receiving downlink information from a base station in an active state, but needs to perform a random access again since an uplink synchronization error exceeds an allowable range. In this case, the exemplary embodiments of FIGS. 3, 6, 8, and 10 may be applicable. The terminal may perform uplink access using an assigned preemptive preamble or may apply the ID-UL grant scheme. In addition, it may be possible for the terminal to maintain a highly reliable connection by improving the synchronization performance by using an RS signal mapped to the ID already possessed.

The third case may be a case in which a terminal in a system connected state handovers from a current serving cell to a target cell. In this case, the conventional scheme of performing handover without a collision by being allocated a preamble for the handover from a target cell may be applied. In addition, a terminal using a preemptive preamble through cooperation (i.e., mapping information exchange) between a serving cell base station and a target cell base station may use the same preemptive preamble in the target cell base station. If the same preemptive preamble is already assigned in the target cell base station, the base station may use a changed preemptive preamble index. That, an exemplary embodiment of FIG. 12 to be described may be applicable.

The fourth case may be a case in which a terminal in a system connected state needs a TA for a purpose of positioning. The assigned preemptive preamble and ID-UL grant scheme may be applicable, and it may be possible for the terminal to improve the synchronization reliability by delivering TA information by using an RS signal mapped to the ID already possessed.

The fifth case may be a case in which a terminal in an RRC idle state transitions to a RRC connected state. The assigned preemptive preamble and ID-UL grant scheme may be applicable. In this case, the terminal may enable quick connection by using an RS signal mapped to the ID. In addition, when the terminal transitions from the active state to the idle state, the preemptive preamble may be returned before entering the idle state. Alternatively, when the terminal again transitions from the active state to the idle state, it may report to the base station that the preemptive preamble is not returned before entering the idle state.

The sixth case may be a case in which a terminal re-establishes a connection after a radio link failure (RLF). The exemplary embodiments of FIGS. 3, 8, and 10 may be directly applied in the same manner as in the first case.

FIG. 12 is a sequence chart illustrating a fifth exemplary embodiment of a method for acquiring and maintaining synchronization in a communication system.

Referring to FIG. 12, in a method for acquiring and maintaining synchronization in a communication system, when terminals 1 and 2 perform handover from a serving base station to a target base station, the serving base station may notify indexes of preemptive preambles of the terminals 1 and 2 to the target base station (S1201). In this case, the target base station may allow the use of the preemptive preamble according to the preemptive preamble index received from the serving base station with respect to the terminal 1, and may inform the terminal 1 of such the permission by transmitting a preemptive preamble permission message to the terminal 1 (S1202). On the other hand, the target base station may not allow the use of the preemptive preamble according to the preemptive preamble index received from the serving base station with respect to the terminal 2, and may inform the terminal 2 of another preemptive preamble (i.e., alternative preemptive preamble) index so that the terminal 2 uses another preemptive preamble (S1203). As such, since the preemptive preambles are specified for the terminals 1 and 2, the base station (i.e., target base station) may transmit the message 2 to each of the terminals 1 and 2 (S1204). Accordingly, each of the terminals 1 and 2 may transmit the message 3 in response to the message 2 (S1205). Then, the base station may transmit the message 4 to each of the terminals 1 and 2 in response to the message 3 to complete the initial access procedure (S1206).

Meanwhile, the present disclosure proposes a method for applying the preemptive preamble to the 3GPP specifications in FIG. 3. To this end, according to an exemplary embodiment, information on preemptive preamble indexes may be added to the system information block 2 (SIB2) included in the broadcast message transmitted by the base station. Accordingly, terminals performing initial access procedures may mask the corresponding indexes from available preambles. According to the 3GPP specifications, the base station may broadcast PRACH configuration information (i.e., prach-Config) through the SIB2.

Figure 13:
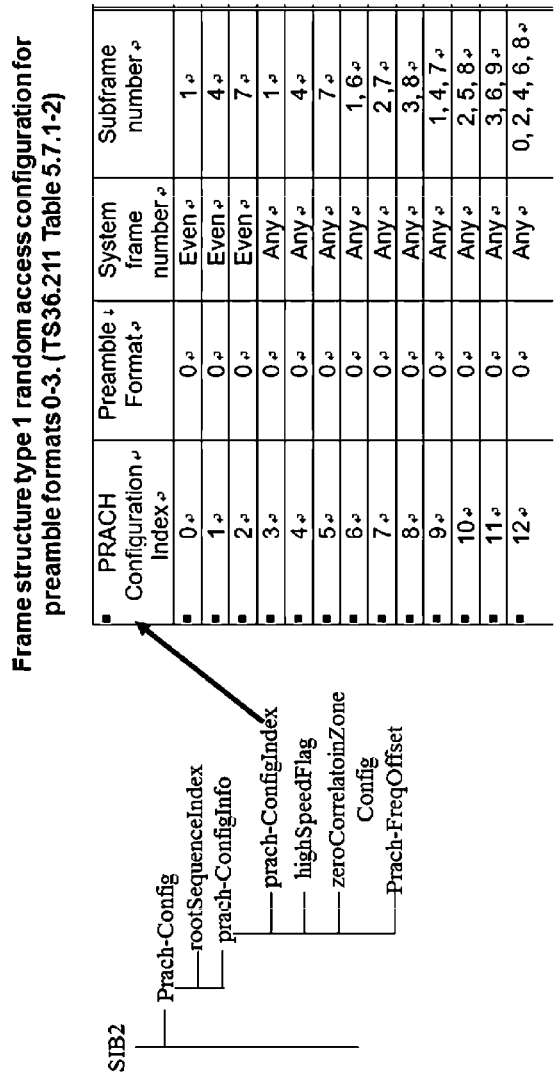
FIG. 13 is a conceptual diagram illustrating a first exemplary embodiment of PRACH configuration information.

FIG. 13 is a conceptual diagram illustrating a first exemplary embodiment of PRACH configuration information.

Referring to FIG. 13, PRACH configuration information may include parameters such as PRACH configuration index parameter (i.e., prach-ConfigIndex), root sequence index (i.e., rootSequenceIndex), high speed flag (i.e., highSpeedFlag), zero correlation zone configuration (i.e., zeroCorrelationZoneConfig), PRACH frequency offset parameter (i.e., prach-FreqOffset), and the like. Among these parameters, the PRACH configuration index parameter may indicate by which frame number (odd, even, or all frames) and subframe number the terminal can transmit a preamble. In addition, the root sequence index may be an index value for discriminating a maximum of 838 root sequences, and the base station may transmit this value to terminals by setting one value among 0 to 837. Then, the terminals wanting to access the base station may apply a root sequence corresponding to the set value to preambles for PRACH transmission. In general, neighboring base stations may prevent collisions by setting the root sequence index values differently from each other.

On the other hand, the terminals may receive the SIB2 from the base station to be accessed and extract information on the preambles. In this case, the terminal may select one of up to 64 preambles according to the number of RA preambles (i.e., numberOfRA-Preamble) set by the base station and use it as a PRACH preamble. The base station may generate 64 preamble sequences by applying a cyclic shift interval to the root sequence corresponding to the root sequence index or a root sequence corresponding to a root sequence index increased by one from the root sequence index. The cyclic shift interval applied by the base station to generate the preamble sequences may be determined by the high-speed flag and the zero correlation zone configuration set in consideration of a movement speed of the terminal.

Figure 14:
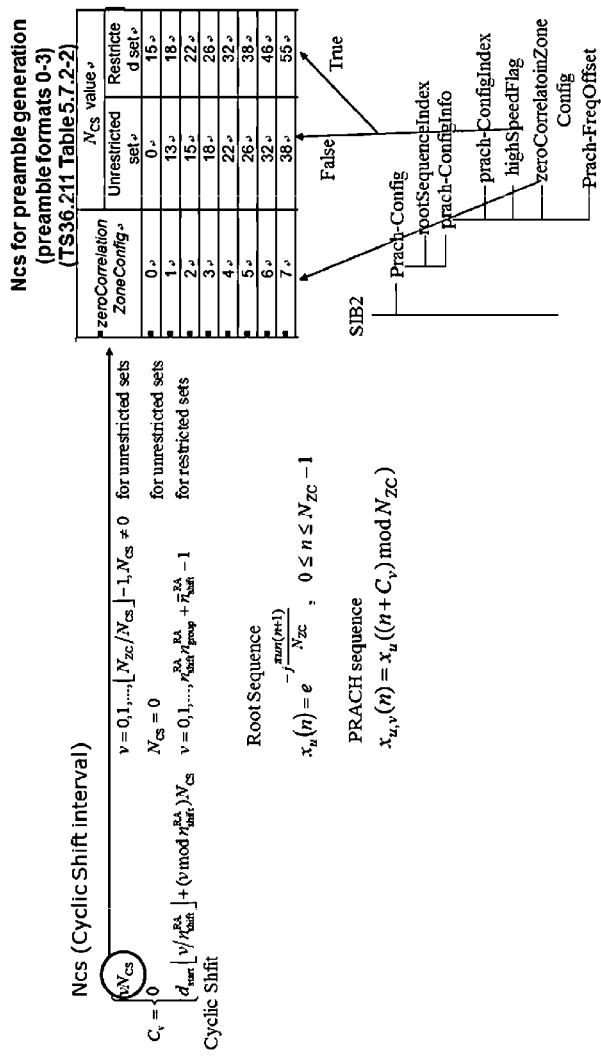
FIG. 14 is a conceptual diagram illustrating a first exemplary embodiment of a method for generating 64 PRACH preambles.

FIG. 14 is a conceptual diagram illustrating a first exemplary embodiment of a method for generating 64 PRACH preambles.

Referring to FIG. 14, the base station may set the high speed flag to 'FALSE' and set the zero correlation zone configuration to 5. If the high-speed flag is set to 'FALSE' and the zero correlation zone configuration is set to 5, the cyclic shift interval configuration (i.e., Ncs configuration) may be 6. Accordingly, the cyclic shift interval for the unrestricted set may be 26. Therefore, the PRACH preamble sequences usable by the terminal may be generated by shifting the root sequence with the cyclic shift interval of Cv. Here, Cv may be a value generated from Ncs, and may be an integer multiple of Ncs in case of the unrestricted set. Cv may be a value obtained by subtracting 1 from a value obtained by dividing the maximum Zadoff Chu sequence length by Ncs. If the number of Cv(s) obtained in the above-described manner is less than 64, the base station may generate a maximum of 64 sequences by using a root sequence obtained by adding 1 to the root sequence index.

Meanwhile, according to the present disclosure, the base station may receive a preemptive preamble use request from the terminal. Then, the base station may reserve the access preamble used for random access by the corresponding terminal to continue to be used even in the system connected state. In addition, the base station may delete the corresponding preamble from the access preamble list when transmitting a broadcast message in order to prevent other terminals that initially access the base station later from using the corresponding preamble, or may notify that the preamble is being dedicatedly used by the terminal. Thereafter, the base station may not allow the use of the corresponding preamble or may allow another preamble to be used.

Figure 15:
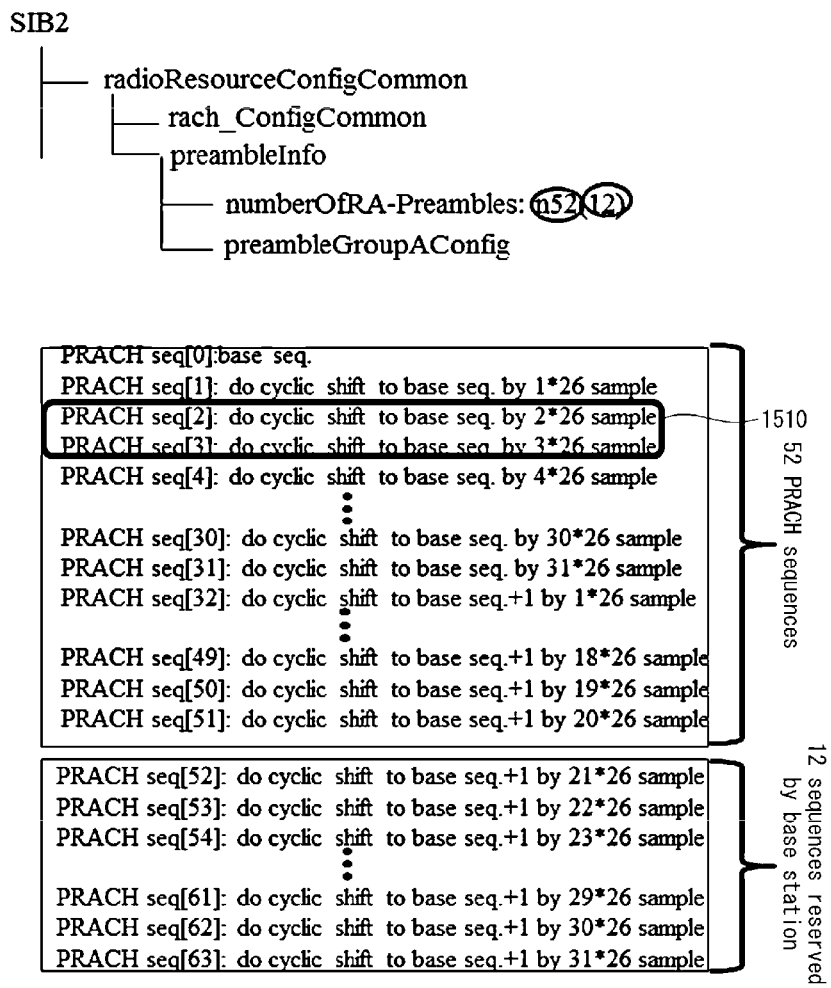
FIG. 15 is a conceptual diagram illustrating a method for configuring PRACH preambles and reserved preambles according to a first exemplary embodiment.

FIG. 15 is a conceptual diagram illustrating a method for configuring PRACH preambles and reserved preambles according to a first exemplary embodiment.

Referring to FIG. 15, the base station may set the RA preamble number to 'n52/n12' so that terminals can use 52 preambles for initial access through the SIB2 (i.e., numberOfRA-Preambles: n52/n12). Each of terminals wanting to access the corresponding base station may select one of 52 PRACH sequences out of 64 preambles that can be generated and use it as a PRACH preamble. The base station may reserve the remaining 12 preambles for non-contention purposes such as handover. In the present disclosure, when the terminal requests to use the PRACH preamble used in the random access procedure as a preemptive preamble in the system connected state, the base station may use a method 1510 in which the base station masks the preamble so that other terminals cannot use the preamble. The base station may add an item called a 'masked preamble index' to the SIB2 in order to mask the preamble and notify other terminals that the preamble is masked. For example, in FIG. 15, the base station may include information such as 'maskedPreambleIndex: 2, 3' in the SIB2 to mask a PRACH sequence 2 and a PRACH sequence 3, and transmit the SIB2 to the terminals. Then, each of the terminals may receive the SIB2 including the information 'maskedPreambleIndex: 2, 3'. Then, each of the terminals may exclude the sequence(s) indicated by the 'maskedPreambleIndex' when selecting a PRACH preamble, and may select a preamble to be used from among the remaining available preambles.

Figure 16:
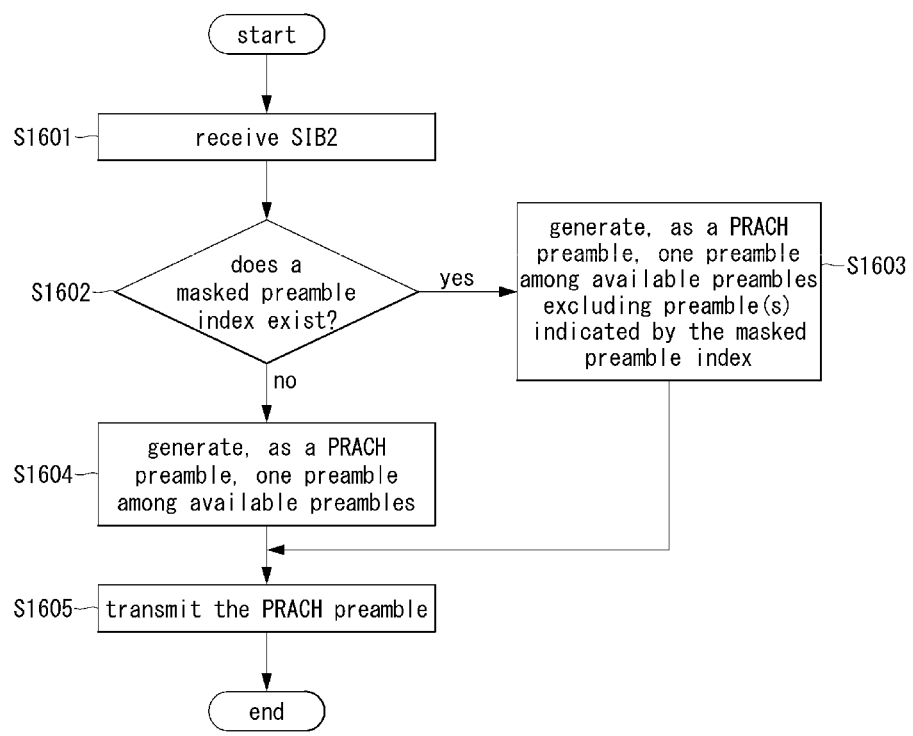
FIG. 16 is a flowchart illustrating a first exemplary embodiment of a method for preventing a preemptive preamble from being selected.

FIG. 16 is a flowchart illustrating a first exemplary embodiment of a method for preventing a preemptive preamble from being selected.

Referring to FIG. 16, the base station may transmit the SIB2 including the masked preamble index to the terminal. Then, the terminal may receive the SIB2 from the base station (S1601). Then, the terminal may determine whether the masked preamble index exists in the received SIB2 (S1602). As a result of the determination, if the masked preamble index exists in the received SIB2, the terminal may generate one preamble as a PRACH preamble from available preambles excluding preamble(s) indicated by the masked preamble index (S1603). Then, the terminal may transmit the generated preamble to the base station (S1605). Accordingly, the base station may receive the corresponding preamble from the terminal. On the other hand, as a result of the determination, if the masked preamble index does not exist in the received SIB2, the terminal may generate one preamble from among all of available preambles as a PRACH preamble (S1604). Then, the terminal may transmit the generated preamble to the base station (S1605). Accordingly, the base station may receive the corresponding preamble from the terminal.

Figure 17:
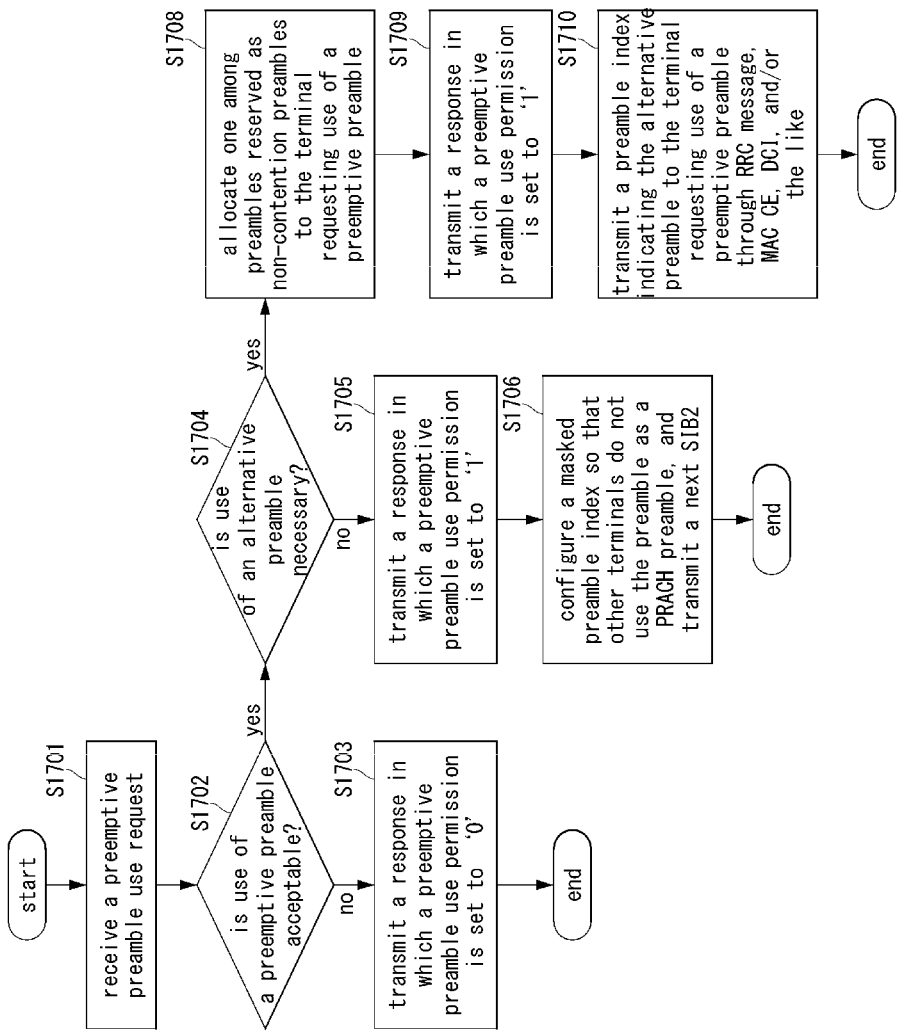
FIG. 17 is a flowchart illustrating a first exemplary embodiment of an operation method of a base station receiving a preemptive preamble use request.

FIG. 17 is a flowchart illustrating a first exemplary embodiment of an operation method of a base station receiving a preemptive preamble use request.

Referring to FIG. 17, when the terminal desires to continue using the preamble used in the initial access procedure as a preemptive preamble, the terminal may transmit a preemptive preamble use request to the base station. Then, the base station may receive the preemptive preamble use request from the terminal (S1701). Thereafter, the base station may determine whether to accept use of a preemptive preamble by the terminal (S1702). As a result of the determination, when it is determined to allow the terminal to use a preemptive preamble, the base station may determine whether it is necessary for the terminal to use another preamble as a preemptive preamble (S1704). As a result of determining whether the base station needs to allow the terminal to use another preamble (i.e., alternative preamble) as a preemptive preamble, if it is necessary to use another preamble, one of the preambles reserved as contention-free preambles may be selected, and allocated to the terminal requesting the use of a preemptive preamble (S1708). Thereafter, the base station may generate a response signal in which a preemptive preamble use permission bit is set to '1' indicating that use of a preemptive preamble is allowed, and transmit the response signal to the terminal (S1709). Then, the terminal may receive the response signal from the base station in which the preemption preamble use permission bit is set to '1' indicating that the use of a preemptive preamble is allowed. In addition, the base station may transmit a preamble index indicating a preamble to be used as a preemptive preamble to the terminal having requested the use of a preemptive preamble through RRC message, medium access control (MAC) control element (CE), DCI, and/or the like in the system connected state (S1710). Then, the terminal may receive the preamble index indicating a preamble to be used as a preemptive preamble through the RRC message, MAC CE, DCI, and/or the like from the base station.

On the other hand, in the S1704, if the base station determines to accept the preemptive preamble use request of the terminal and the preamble used by the terminal in the initial access procedure can be used as a preemptive preamble (i.e., alternative preamble does not need to be used as the preemptive preamble), the base station may generate a response signal in which a preemptive preamble use permission bit is set to '1' indicating that the use of a preemptive preamble is allowed, and transmit the response signal to the terminal (S1705). Then, the terminal may receive the response signal from the base station in which the preemptive preamble use permission bit is set to '1' indicating that the use of a preemptive preamble is allowed. In addition, the base station may include an index of the corresponding preamble in the masked preamble index to prevent other terminals from using it as a PRACH preamble, and transmit the SIB2 including the masked preamble index to the terminal (S1706). Then, terminals may receive the SIB2 including the masked preamble index from the base station.

On the other hand, in the step S1702, if the base station cannot accept the preemptive preamble use request of the terminal, the base station may generate a response signal in which a preemptive preamble use permission bit is set to '0' indicating that the use of a preemptive preamble is not allowed, and transmit the response signal to the terminal (S1703). Then, the terminal may receive from the base station the response signal in which the preemptive preamble use permission bit is set '0' indicating that the use of a preemptive preamble is not allowed. Meanwhile, in order for the base station to clearly convey the intention of allocating an alternative preamble to the terminal, two bits may be used to indicate the preemptive preamble use permission. For example, '00' may indicate 'Not allowed', '01' may indicate 'Allowed', and indicate that the preamble used by the terminal in the initial access procedure can be used as a preemptive preamble, and '10' or '11' may indicate 'Allowed', and indicate that an alternative preamble, other than the preamble used by the terminal in the initial access procedure, is allowed to be used as a preemptive preamble.

Then, the present disclosure proposes a method in which the terminal in the inactive state can synchronize directly with the base station by using the preemptive preamble without a separate PRACH procedure.

According to the 3GPP specifications, a terminal may save radio resources after being connected to a base station, and may support operations in the RRC connected-inactive state to reduce power consumption. In such the RRC connected-inactive state, the terminal may maintain the connected state with a core network, although a radio connection is in the RRC idle state. Accordingly, when the terminal suddenly transitions to the connected state, it does not require a separate signaling with the core network, so that the terminal can be quickly transitioned to the RRC connected state. In particular, in the case of wireless application services that require quick response and collaboration between neighboring terminals, such as factory automation, clock synchronization between the terminals may be very important. However, all the terminals may not always maintain the RRC connected state. A terminal that needs to reduce power consumption may have to transition to the connected state after being in the RRC connected-inactive state. In this case, the terminal can perform tasks in collaboration with other terminals only after transitioning to the RRC connected state and acquiring clock synchronization with the neighboring terminals. If the terminal is slower in clock synchronization, collaboration with other terminals may be delayed, and overall system efficiency may be reduced. Therefore, in preparation for this case, by transmitting the pre-allocated preemptive preamble to the base station, the terminal may acquire clock synchronization with the neighboring terminals without collision, so that the terminal can quickly enter into the collaborative work with the neighboring terminals.

Figure 18:
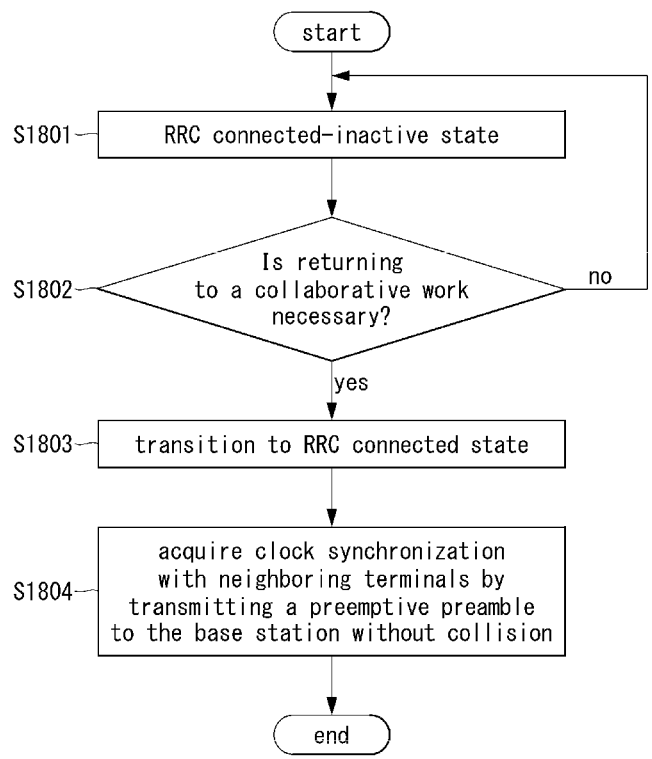
FIG. 18 is a flowchart illustrating a first exemplary embodiment of a method for using a preemptive preamble in the RRC connected-inactive state.

FIG. 18 is a flowchart illustrating a first exemplary embodiment of a method for using a preemptive preamble in the RRC connected-inactive state.

Referring to FIG. 18, the terminal in the RRC connected-inactive state with the base station may determine whether returning to a collaborative work with neighboring terminals is necessary (S1802). As a result of the determination, the terminal may maintain the RRC connected-inactive state if it is not necessary to return to the collaborative work. On the other hand, the terminal may transition to the RRC connected state if it is necessary to return to the collaborative work as a result of the determination (S1803). Then, the terminal may acquire clock synchronization with the neighboring terminals by transmitting the already secured preemptive preamble to the base station without collision (S1804).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
   receiving, from a first base station, information on preambles for random access;
   transmitting, to the first base station, a first message including a preamble selected based on the information on the preambles;
   receiving, from the first base station, a second message that is a response signal for the first message;
   transmitting, to the first base station, a third message requesting a preemptive use of the selected preamble during a first preemptive use period; and
   receiving, from the first base station, a fourth message allowing the preemptive use of the selected preamble during the first preemptive use period, and performing a random access procedure by using the selected preamble during the first preemptive use period.

2. The operation method according to claim 1, further comprising, when the first base station does not allow the preemptive use during the first preemptive use period, receiving a fifth message allowing the preemptive use of the selected preamble during a second preemptive use period, and performing a random-access procedure by using the selected preamble during the second preemptive use period.

3. The operation method according to claim 1, further comprising, when the first base station does not allow the preemptive use of the selected preamble, receiving a fifth message allowing a preemptive use of an alternative preamble during the first preemption use period, and performing a random access procedure by using the alternative preamble during the first preemptive use period.

4. The operation method according to claim 1, further comprising, when the first base station does not allow the preemptive use of the selected preamble during the first preemptive use period, receiving a fifth message allowing a preemptive use of an alternative preamble during a second preemptive use period, and performing a random access procedure by using the alternative preamble during the second preemptive use period.

5. The operation method according to claim 1, wherein the first message and the third message are combined and transmitted to the first base station as a message A, and the second message and the fourth message are combined and received from the first base station as a message B.

6. The operation method according to claim 1, further comprising:
   starting a procedure for handover to a second base station;
   receiving a sixth message allowing a preemptive use of the selected preamble from the second base station; and
   performing a random access procedure with the second base station by using the selected preamble.

7. The operation method according to claim 1, further comprising:
   starting a procedure for handover to a second base station;
   receiving a sixth message allowing a preemptive use of an alternative preamble other than the selected preamble from the second base station; and
   performing a random access procedure with the second base station by using the alternative preamble.

8. The operation method according to claim 1, wherein the information on the preambles includes masked preamble index(es) indicating preamble(s) that are not allowed to be used, and the selected preamble is selected from preambles excluding the preamble(s) indicated by the masked preamble index(es).

9. The operation method according to claim 1, further comprising:
   determining whether to return to a cooperative work in a radio resource control (RRC) connected-inactive state;
   in response to determining to return to the collaborative work, transitioning to an RRC connected state; and
   acquiring inter-terminal clock synchronization by transmitting the selected preamble to the first base station.

10. An operation method of a first base station in a communication system, the operation method comprising:
    transmitting, to a terminal, information on preambles for random access;
    receiving, from the terminal, a first message including a preamble selected based on the information on the preambles;
    transmitting, to the terminal, a second message that is a response signal for the first message;
    receiving, from the terminal, a third message requesting a preemptive use of the selected preamble during a first preemptive use period; and
    transmitting, to the terminal, a fourth message allowing the preemptive use of the selected preamble during the first preemptive use period.

11. The operation method according to claim 10, further comprising, when the first base station does not allow the preemptive use during the first preemptive use period, transmitting, to the terminal, a fifth message allowing the preemptive use of the selected preamble during a second preemptive use period.

12. The operation method according to claim 10, further comprising, when the first base station does not allow the preemptive use of the selected preamble, transmitting, to the terminal, a fifth message allowing a preemptive use of an alternative preamble during the first preemption use period.

13. The operation method according to claim 10, further comprising, when the first base station does not allow the preemptive use of the selected preamble during the first preemptive use period, transmitting, to the terminal, a fifth message allowing a preemptive use of an alternative preamble during a second preemptive use period.

14. The operation method according to claim 10, wherein the first message and the third message are combined and received from the terminal as a message A, and the second message and the fourth message are combined and transmitted to the terminal as a message B.

15. The operation method according to claim 10, further comprising:
   starting a procedure for handover of the terminal to a second base station; and
   transmitting information on the selected preamble to the second base station.

16. The operation method according to claim 10, further comprising:
   setting an index of the selected preamble as a masked preamble index; and
   generating a system information block 2 (SIB2) including the set masked preamble index and transmitting the generated SIB2 to other terminals.

\* \* \* \* \*